United States Patent
Herold et al.

(10) Patent No.: US 6,691,258 B1
(45) Date of Patent: Feb. 10, 2004

(54) BUS CONTROL UNIT FOR ASSISTED PROGRAM FLOW MONITORING IN STAR TOPOLOGIES, ASSOCIATED PROGRAM FLOW MONITORING SYSTEM AND METHOD FOR PROGRAM FLOW MONITORING

(75) Inventors: Bernd Herold, Stuttgart (DE); Franz Hutner, Einsbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/744,850

(22) PCT Filed: Jul. 21, 1999

(86) PCT No.: PCT/DE99/02254
§ 371 (c)(1),
(2), (4) Date: Jun. 19, 2001

(87) PCT Pub. No.: WO00/07103
PCT Pub. Date: Feb. 10, 2000

(30) Foreign Application Priority Data

Jul. 30, 1998 (DE) .......................... 198 34 425

(51) Int. Cl.⁷ .............................................. G06F 11/00
(52) U.S. Cl. .............................. 714/45; 714/28; 714/39
(58) Field of Search .................. 714/28, 37, 42, 714/45, 39; 710/107, 131

(56) References Cited

U.S. PATENT DOCUMENTS

| | | | | |
|---|---|---|---|---|
| 4,554,661 A | * | 11/1985 | Bannister | ...................... 714/45 |
| 4,688,168 A | * | 8/1987 | Gudaitis et al. | ............ 710/107 |
| 5,642,478 A | | 6/1997 | Chen et al. | |
| 5,673,413 A | * | 9/1997 | Deshpande et al. | ......... 711/141 |
| 5,684,947 A | * | 11/1997 | Horie | ........................ 714/37 |
| 6,233,531 B1 | * | 5/2001 | Klassen et al. | ............... 702/80 |
| 6,260,098 B1 | * | 7/2001 | Ku | .............................. 710/313 |
| 6,298,409 B1 | * | 10/2001 | Sheikh et al. | ............... 710/260 |
| 6,351,724 B1 | * | 2/2002 | Klassen et al. | ............. 702/186 |
| 6,357,024 B1 | * | 3/2002 | Dutton et al. | ............... 714/45 |
| 6,385,742 B1 | * | 5/2002 | Kirsch et al. | ................. 714/39 |
| 6,430,642 B1 | * | 8/2002 | Stracovsky et al. | ......... 710/244 |
| 6,467,083 B1 | * | 10/2002 | Yamashita | .................. 717/128 |

FOREIGN PATENT DOCUMENTS

DE  692 19 706 T2  4/1997

\* cited by examiner

Primary Examiner—Robert Beausoliel
Assistant Examiner—Bryce P. Bonzo
(74) Attorney, Agent, or Firm—Bell Boyd & Lloyd LLC

(57) ABSTRACT

The present invention relates to a bus control unit for supporting data flow monitoring in a star topology, wherein an address comparator a target address, which is present at a bus interface, with a monitoring address area and deactivates an associated data processing unit connected to a monitoring bus interface and mirror-images the data stream to the monitoring bus interface if the target address which is present does not match the monitoring address area.

10 Claims, 2 Drawing Sheets

BUS CONTROL UNIT FOR ASSISTED PROGRAM FLOW MONITORING IN STAR TOPOLOGIES, ASSOCIATED PROGRAM FLOW MONITORING SYSTEM AND METHOD FOR PROGRAM FLOW MONITORING

BACKGROUND OF THE INVENTION

1. Field of the Invention

The present invention relates to a bus control unit for star architectures having trace support and/or for supporting program flow monitoring, to a program flow monitoring system using this bus control unit and to a method for program flow monitoring.

2. Description of the Prior Art

To monitor and test software programs, it is necessary, in many applications, to monitor the program in its actual hardware environment in order to find dynamic software errors which only become apparent in A "use". In particular, in switching systems for telecommunications which have extremely complex software, such a possible way of performing "debugging" of the software is necessary and extremely useful.

FIG. 1 shows a block diagram of a processor architecture according to the prior art. In FIG. 1, the reference symbol 1 designates a central processor unit or CPU, and the reference symbol 2 designates a coprocessor, or an additional central processing unit, which supports the central processing unit 1. 3 designates an input/output unit, 5 designates a common main storage and 6 designates a program flow monitoring device or tracer. The central processing unit 1, the coprocessor 2, the input/output unit 3, the main storage 5 and the program flow monitoring device 6 are connected to one another via a common bus 4.

Software programs which use the processor architecture with a common bus according to FIG. 1 are usually initially checked and tested with respect to their functional capability by software. However, when the program is used in the actual hardware environment according to FIG. 1, further software errors can occur owing to the multiplicity of external parameters, and searching for these software errors is extremely time-consuming and difficult. In order to simplify this "debugging" of the software or of the error search in the software program, the tracer or program flow monitoring device 6 is connected to the common bus 4 in a hardware environment which is actually used, such as that illustrated, in FIG. 1. This tracer 6 records the entirety of the data stream which is present at the common bus 4 and which flows between the central processing unit 1, the coprocessor 2, the input/output unit 3 and the main storage 5. As a result, software errors which occur in actual use can be found and eliminated relatively easily.

However, the processor architecture with a common bus according to FIG. 1 has the disadvantage that the data transmission rates on the common bus 4 are relatively low because the bus has a comparatively low bus frequency and the bus-seizure times are long.

Therefore, by way of replacement, a star architecture has been designed in which the respective data processing units are arranged in a star-shaped configuration and do not have a common bus. Because the individual buses in the star-shaped topology can be operated at higher frequencies and their seizure times are independent of one another, higher data rates are thus obtained.

FIG. 2 shows a block diagram of a processor architecture with a star topology according to the prior art. In FIG. 2, the reference symbol 1 again designates the central processing unit CPU, the reference symbol 2 designates the coprocessor, the reference symbol 3 designates the input/output unit and the reference symbol 5 designates the common main storage. The respective data processing units 1, 2, 3 and 5 are connected to one another in a star-shaped configuration via a bus control unit 7. Here, the central processing unit 1 is connected to the bus control unit 7 via a processor bus 8, while the coprocessor 2 is connected to the bus control unit 7 via a coprocessor bus 11. In the same way, an input/output bus 9 connects the bus control unit 7 to the input/output unit 3, and a storage bus 10 connects the bus control unit 7 to the common main storage 5. As illustrated in FIG. 2, the star-shaped topology has the advantage over the processor architecture with common bus according to FIG. 1 in that, for example, a data stream I can flow between the coprocessor 2 and the input/output unit 3 via the bus control unit 7 and the coprocessor bus 11 and the input/output bus 9, while a data stream II flows from the central processing unit 1 to the common main storage 5 via the processor bus 8, the bus control unit 7 and the storage bus 10. In the same way, a data stream III can flow between the central processing unit 1 and the coprocessor 2, independently of a data stream IV from the input/output unit 3 to the main storage 5.

However, these advantages of a processor architecture with star topology according to the prior art have a significant disadvantage with respect to the debugging or monitoring possibilities via the tracer 6.

Because there is no common bus 4 in the star topology of FIG. 2, the tracer or program flow monitoring unit 6 does not have a common interface at which all the data of the system can be monitored. Consequently, to debug a software program, each data processing unit must be observed independently and separately from the others. In order to observe the data stream I, it is necessary according to FIG. 2 to connect the tracer 6 to the input/output bus 9, for example. To observe the data stream II between the central processing unit 1 and the main storage 5, the tracer 6 must be connected to the storage bus 10. As an alternative, the tracer 6 also could be connected to the coprocessor 11 in order to observe the data stream I flowing between the coprocessor and input/output unit. To monitor the data stream II, it is also possible to connect the tracer 6 to the processor bus 8.

Simple and cost-effective troubleshooting therefors is not possible with a conventional processor architecture with star topology.

The invention is thus directed to providing a bus control unit, a program flow monitoring system and a method for program flow monitoring for a star topology, wherein troubleshooting in an application program is possible in a simple and cost-effective manner.

SUMMARY OF THE INVENTION

Accordingly, the present invention makes use of a multiplicity of address comparators for making a comparison between an address which is present in a particular case and a predefined address area, in which case a predefined data processing unit is deactivated and a data stream is mirror-imaged to the bus interface of the associated bus if the address which is present does not occur in the predefined address area. Data is also mirror-imaged onto a predefined bus even if it is not actually intended for this bus, for which reason it can be monitored by the program flow monitoring unit. However, because the data processing unit which is associated with the predefined bus is also deactivated, there is no unintended exchange of data between data processing units.

The data processing unit which is connected to the predefined bus is preferably a passive data processing unit and/or a data processing unit which is accessed jointly by the other data processing units. In particular, this predefined data processing unit is a common main storage.

The predefined data processing unit is preferably deactivated using a data processing unit selection signal with which the unit is switched into an inactive state.

The program flow monitoring system for a star topology is composed of the bus control unit described above, wherein a flow monitoring device for monitoring the data stream is connected to the predefined bus.

In the method for program flow monitoring in a star architecture, a predefined bus which is to be monitored is initially defined, and then an address area which is associated with this bus is defined. The addresses which are present at the various buses are then compared with the predefined address area. If the present address does not occur in the predefined address area, the predefined data processing unit which is connected to the predefined bus is deactivated and then the data stream is mirror-imaged to the predefined bus. Subsequently, the data stream can be monitored at the predefined bus. In this way, all the data streams flowing in the star topology can be monitored by a common tracer 6 in a simple and cost-effective way.

Additional features and advantages of the present invention are described in, and will be apparent from, the following Detailed Description of the Preferred Embodiments and the Drawings.

DETAILED DESCRIPTION OF THE PREFERRED EMBODIMENT

Figure 1:
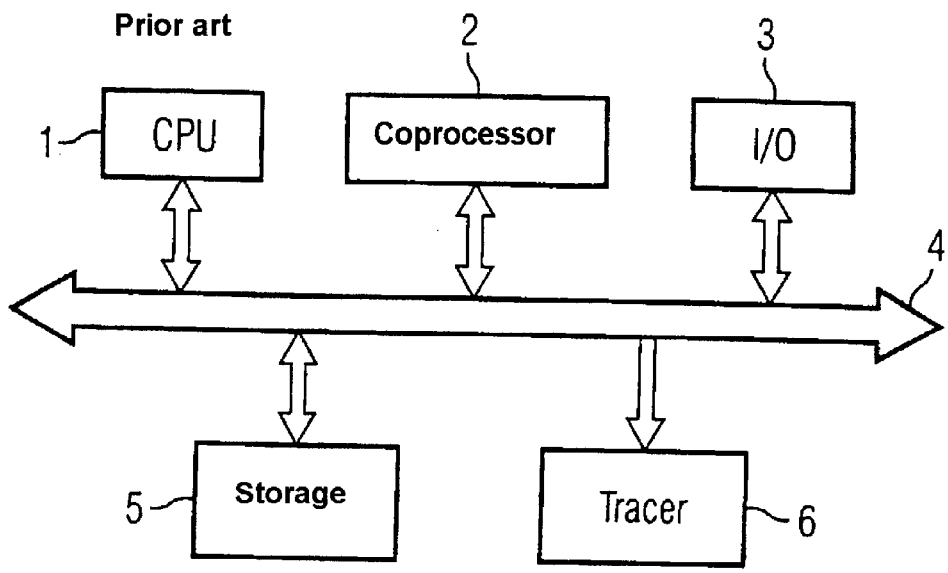
FIG. 1 shows a block diagram of a processor architecture with common bus according to the prior art.
Figure 2:
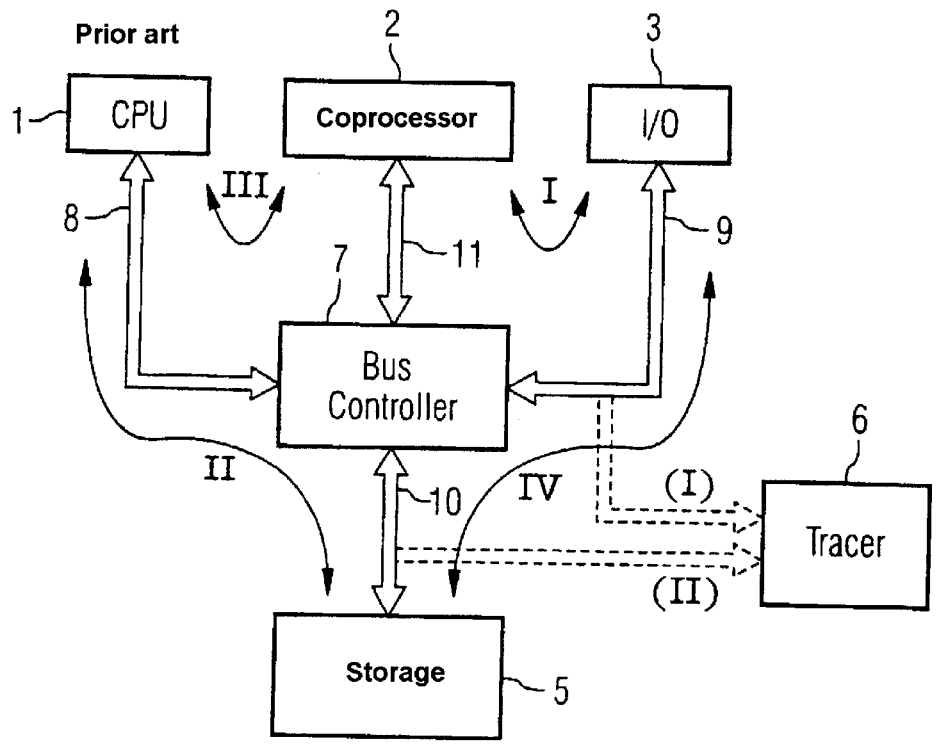
FIG. 2 shows a block diagram of a processor architecture with star topology according to the prior art.
Figure 3:
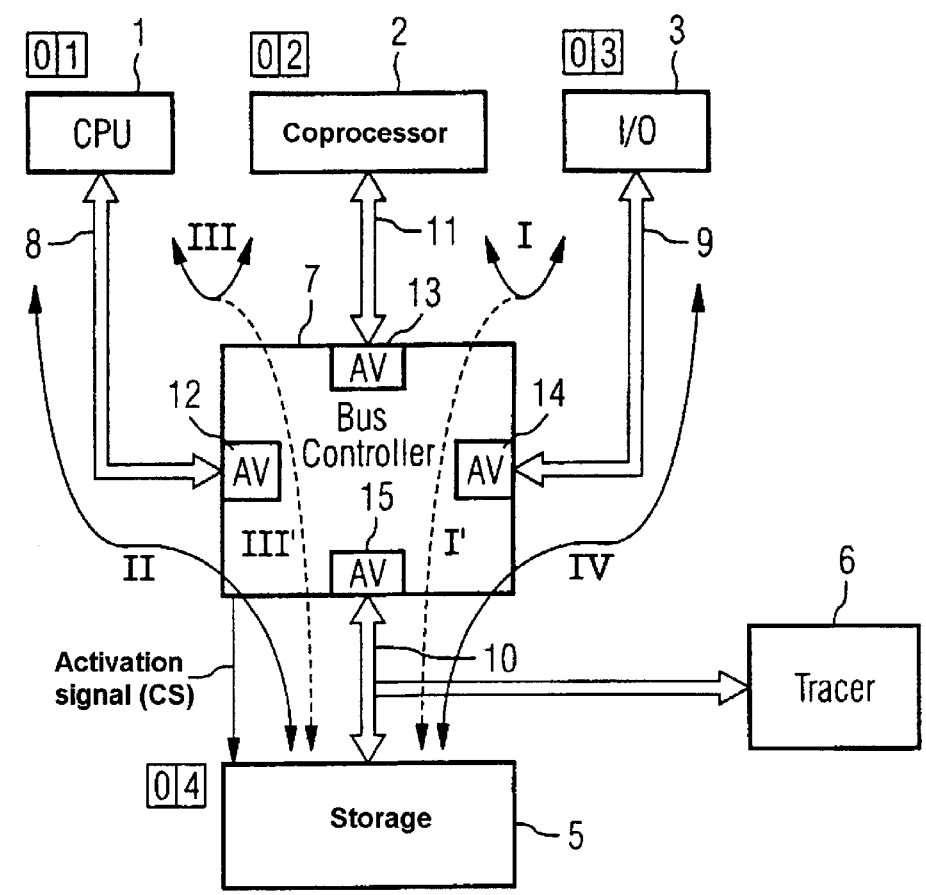
FIG. 3 shows a block diagram of a processor architecture with star topology according to an exemplary embodiment of the present invention.

FIG. 3 shows a block diagram of a processor architecture with star structure according to the present invention. The block diagram according to FIG. 3 corresponds essentially to the block diagram of FIG. 2 and constitutes a program flow monitoring system in accordance with the teachings, of the present invention.

The reference symbol 1 designates a central processing unit or CPU, the reference symbol 2 designates a coprocessor or an additional central processing unit, the reference symbol 3 designates an input/output unit, the reference symbol 5 designates a main storage and the reference symbol 6 designates a tracer or a program flow monitoring unit. A bus control unit 7 assumes the control of the bus system which is arranged in a star-shaped configuration and by which the active data processing units 1, 2 and 3 and the passive data processing unit 5 are connected to one another. The bus system which is arranged in a star-shaped configuration is composed, in the processor architecture according to FIG. 3, of a processor bus 8, an input/output bus 9, a storage bus 10 and a coprocessor bus 11. The tracer 6 is preferably connected to the storage bus 10, which thus constitutes a predefined bus.

The bus control unit 7 of the present invention has a multiplicity of bus interfaces which are each assigned to a data processing unit. A bus interface 12 is assigned here to the processor bus 8 or the central processing unit 1. A bus interface 13 is assigned to the coprocessor bus 11 or the coprocessor 2. A bus interface 14 is assigned to the input/output bus or the input/output unit 3. A bus interface 15 is assigned to the storage bus 10 or the main storage 5. Because the tracer 6 is connected to the storage bus 10, the bus interface 15 constitutes the predefined bus interface.

The bus control unit 7 according to the exemplary embodiment in FIG. 3 has four bus interfaces, but is not restricted to that number and can have fewer or significantly more bus interfaces. However, the present invention is particularly advantageous with the number of bus interfaces being greater than three.

In order to control the data stream within the star topology, the bus control unit 7 assigns a specific address area to each data processing unit or each associated bus interface. In the exemplary embodiment according to FIG. 3, the central processing unit 1 or the bus interface 12 has the address area 01. The coprocessor 2 and/or the bus interface 13 have the address area 02. The input/output unit 3 or the bus interface 14 is assigned the address area 03 while the main storage 5 or the bus interface 15 is assigned the address area 04.

A brief explanation of the way in which the data stream is connected through between the individual data processing units is given below. If, for example, data is to be transmitted from the coprocessor 2 to the input/output unit 3, the coprocessor 2 transmits a data stream to the bus control unit 7 via the coprocessor bus 11, during which process the input/output unit 3 is addressed. This connecting through of a data stream I from the coprocessor 2 to the input/output unit 3 is carried out via a data stream switch which is assigned to the respective bus interfaces. In this process, in order to connect through a data stream I between the coprocessor 2 and the input/output unit 3, the address signal of the data transmitted by the coprocessor 2 is checked by the data stream switch in the bus interface 13, is checked and a connection is set up to the bus interface 14 in accordance with the address signal, with the result that the data stream I is conducted from the coprocessor 2 via the coprocessor bus 11, the bus interface 13, the bus interface 14 and the input/output bus 9 to the input/output unit 3. In the same way, a data stream II can be conducted from the central processing unit 1 to the main storage 5, a data stream III can be conducted from the central processing unit 1 to the coprocessor 2, or a data stream IV can be conducted from the input/output unit 3 to the main storage 5. Furthermore, a multiplicity of further connection possibilities are possible via the bus control unit 7 which, however, will not be described here further.

The tracer 6 is connected to the storage bus 10 in order to monitor the data streams and/or to debug application software in the actual system. In this way, all data streams which are present at the storage bus 10 can be monitored or recorded from the tracer 6. According to FIG. 3, these are, for example, the data stream II from the central processing unit 1 to the main storage 5 and the data stream IV from the input/output unit 3 to the main storage 5.

In order for the data streams which are not present on the storage bus to be monitored by the tracer 6, as is the case for the data streams I and III according to FIG. 3, the bus control unit 7 has, in particular, address comparators AV and mirror-imaging devices for mirror-imaging data streams to the predefined bus interfaces. The address comparators AV, like the data stream switches, are preferably located on the bus interface 12, 13, 14 or 15, but also may be arranged at some other point within the bus control unit 7.

If, for example, a data stream III then flows a from the central processing unit 1 to the coprocessor 2, the data is transmitted from the central processing unit 1 via the processor bus 8 to the bus interface 12 of the bus control unit 7 with a predefined target address (i.e., address area 02 of the coprocessor 2). A data path is switched in the bus control unit 7 from the bus interface 12 to the bus interface 13 in accordance with the destination address. However, the address comparator AV also compares the address or target address present at the bus interface 12 with a predefined address area which, in the exemplary embodiment according to FIG. 3, corresponds to the address area 04 for the main storage 5.

In the event of the address present at the bus interface 12 not matching the predefined address area 04 of the main storage 5 or not occurring in this address area 04, the address comparator AV causes the main storage 5 to be deactivated and the data stream III to be mirror-imaged in the direction of the predefined storage bus 10 or of the predefined storage bus interface 15. According to FIG. 3, this mirror-imaged data stream III' is represented by a dashed line and flows in addition to the actual data stream III.

Figure 4:
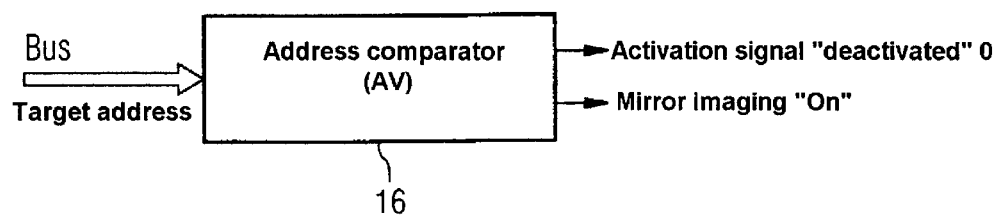
FIG. 4 shows a diagram of an address comparator such as is used in the bus control unit according to FIG. 3.

FIG. 4 shows a representation of the address comparator 16 used in the bus control unit 7. The address comparator 16 compares a target address fed by a respective bus with one or more address areas. According to FIG. 3, the address present at the address comparator 16 is compared with an address area 04 because the tracer 6 is connected to the storage bus 10 assigned to this address area 04.

In the same way, the address comparator 16 can compare the target address present at the bus interface 12 with another address area, but the tracer 6 must be connected to the respective other bus interface in a corresponding way. If matching of the target address to the predefined address 04 is detected in the address comparator 16, no mirror-imaging takes place because the data is connected through to the predefined bus, i.e. storage bus 10, and monitored by the tracer 6 anyway. However, if the target address supplied by the respective bus differs from the predefined address area 04, this signifies a data stream which could not be monitored on the storage bus 10, for which reason the address comparator 16 sets to 0, or deactivates an activation signal for the predefined data processing unit (main storage 5 according to FIG. 3). Furthermore, mirror-imaging of the data stream is carried out in the bus control unit 7 to the predefined bus interface (bus storage interface 15 according to FIG. 3) so that the data stream is connected not only through to the target address but also to the predefined bus interface. This has the advantage that, for example, not only does the data stream III continue to be connected through from the central unit 1 to the coprocessor 2, but a data stream III' is also mirror-imaged to the bus interface 15 and to the storage bus 10 so that the data stream III can then be monitored or traced in the form of the mirror-imaged data stream III' at the tracer 6. Because the data stream III' completely matches the data stream III, even with a processor architecture with star topology, debugging of a software program can be carried out easily in the actual field of application.

In the description above, the target address which is present at the address comparator 16 is compared with the predefined address area 04, and if there is no match with the address area 04 the associated predefined data processing unit (main storage 5) is deactivated and the data is mirror imaged. However, the target address supplied by the respective bus also can be compared with the further address areas 01, 02 and 03, the predefined data processing unit being deactivated and the data streams being mirrored only if the target address matches one of the address areas 01, 02 and/or 03, or occurs in one of there areas.

In the exemplary embodiment according to FIG. 3, a respective address comparator AV is provided at each bus interface 12, 13, 14 and 15 in order to compare the target address with one or more address areas. However, there also may be just one address comparator provided in the bus control unit if it is capable of evaluating the target addresses supplied at the respective bus interfaces and is capable, when a data stream is absent at a predefined bus interface, of deactivating the data processing unit connected to this bus interface and mirror-imaging the data stream to the predefined bus interface.

The data streams are preferably mirror-imaged by additionally activating the data paths to the predefined bus interface, for which a wide variety of logic gates can be used. Given a suitable circuit design, the data, stream switches also may be used for data mirror-imaging.

In the exemplary embodiment according to FIG. 3, the main storage 5 is selected as a predefined data processing unit. This is due to the fact that most of the data processing units used in a processor architecture access the storage and thus 90% of the data streams in a processor architecture with star topology are, therefore, processed via the storage bus 10. In this way, when the tracer 6 is connected to the storage bus 10, 90% of the data streams flowing in the processor architecture already can be monitored and recorded. For the remaining 10% of data streams, the deactivation of the main storage 5 and the mirror-imaging of the data streams takes place in the way described above.

A further advantage if the main storage 5 is selected as a predefined data processing unit is that the main storage 5 has, in any case, a storage selection signal which can be used as an activation signal by the address comparator 16. In dynamic memories (DRAMS) which are typically used today, the storage selection signal can be set to 0, or the entire main storage 5 can be deactivated, and the data stream then can be mirror-imaged. In this way, a collision of data or a misallocation of storage locations easily can be avoided.

The access control or arbitration unit of the bus control unit 7 is configured here in such a way that it permits only one active processing cycle per time unity; i.e., only one of the active data processing units 1, 2 or 3 can transmit at one point in time. The access controller in the bus control unit 7 can thus permit only one point-to-point connection at the same time.

In this way, the data stream in a processor architecture with star topology can be completely registered and monitored, permitting debugging or detection of software errors to be carried out easily and cost-effectively under practical application conditions.

A method for program flow monitoring for the processor architecture with star topology discussed above will now be described. Firstly, a predefined bus 10 which is to be monitored is selected from the multiplicity of buses 8, 9, 10 or 11. Then, a predefined address area 04 is assigned to the predefined bus 10. Subsequently, the addresses associated with the data streams on the respective buses are registered and compared with the predefined address area 04. If the addresses which are associated with the data streams do not occur in the predefined address area 04, the data processing unit which is connected to the predefined bus 10 is deactivated and the associated data streams are mirror-imaged in the direction of the predefined bus 10. The mirror-imaged data streams I', III' and the non-mirror-imaged data streams II, IV thus can be completely monitored and recorded at the predefined bus 10 via a tracer 6.

The method described above, like the bus control unit 7, is not restricted to the exemplary embodiment illustrated in FIG. 3, but rather includes all other processor architectures. In the same way as the bus control unit 7, the method for program flow monitoring can be applied not only to star topologies but also to mixed topologies in which a star topology is combined with a topology with a common bus.

The present invention has been described according to FIG. 3 by reference to a PC architecture, but applications for workstations and control systems in the field of telecommunications and in other fields are included in the same way. Similarly, a plurality of storage units or other active and passive data processing units also may be used in the star topology. The bus control unit 7 preferably can be implemented as an ASIC, but there is also the possibility of implementing the entire processor architecture as a full custom IC, with the storage bus 10 being connected externally in the module as a tracer terminal. In the same way, a wide variety of bus driver systems may be used as long as they permit deactivation of a predefined data processing unit and mirror-imaging of data streams.

Although the present invention has been described with reference to specific embodiments, those of skill in the art will recognize that changes may be made thereto without departing from the spirit and scope of the invention as set forth in the hereafter appended claims.

We claim as our invention:

1. A bus control unit for a star topology, the bus control unit comprising:
   a plurality of bus interfaces to which a respective plurality of data processing units are connected via a respective plurality of buses, the data processing unit being assigned respective address areas;
   a plurality of data stream switches respectively associated with the plurality of bus interfaces and respectively connecting through a data stream corresponding to a target address to the associated bus interface; and
   at least one address comparator for comparing the target address present at the respective bus interface with a predefined address area which is assigned a predefined data processing unit and a predefined bus interface, the predefined data processing unit being deactivated and a data stream being mirror-imaged to the predefined bus interface if the target address being compared does not occur in the predefined address area.

2. A bus control unit for a star topology as claimed in claim 1, wherein the predefined address area is assigned to a passive data processing unit.

3. A bus control unit for a star topology as claimed in claim 1, wherein the predefined address area is assigned to a common data processing unit.

4. A bus control unit for a star topology as claimed in claim 1, wherein the predefined data processing unit is a main storage unit.

5. A bus control unit for a star topology as claimed in claim 1, wherein the deactivation of the predefined data processing unit is effected via a data processing unit selection signal.

6. A program flow monitoring system for a star topology having a bus control unit, the system comprising:
   a plurality of bus interfaces to which a respective plurality of data processing units are connected via a respective plurality of buses, the data processing units being assigned respective address areas;
   a plurality of data stream switches respectively associated with the plurality of bus interfaces and respectively connecting through a data stream corresponding to a target address to the associated bus interface;
   at least one address comparator for comparing the target address present at the respective bus interface with a predefined address area which is assigned a predefined data processing unit and a predefined bus interface, the predefined data processing unit being deactivated and a data stream being mirror-imaged to the predefined bus interface if the target address being compared does not occur in the predefined address area; and
   a flow monitoring device for monitoring the data stream via the predefined bus interface.

7. A method for program flow monitoring in a star topology having a bus control unit which includes a plurality of bus interfaces to which a respective plurality of data processing units are connected via a respective plurality of buses, the method comprising the steps of:
   defining a predefined bus which is to be monitored from among the plurality of buses;
   defining a predefined address area which is associated with the predefined bus;
   comparing a respective target address which is present at the plurality of buses with the predefined address area;
   deactivating the data processing unit which is respectively connected to the predefined bus;
   mirror-imaging a data stream flowing between the plurality of buses, with the exception of the predefined bus, to the predefined bus if the target address which is present does not occur in the predefined address area; and
   carrying out program flow monitoring at the predefined bus.

8. A method for program flow monitoring in a star topology having a bus control unit as claimed in claim 7, wherein the predefined bus which is to be monitored is assigned to a passive data processing unit.

9. A method for program flow monitoring in a star topology having a bus control unit as claimed in claim 7, wherein the predefined bus is assigned to a common data processing unit.

10. A method for program flow monitoring in a star topology having a bus control unit as claimed in claim 7, wherein the predefined bus is assigned to a main storage unit.

* * * * *